United States Patent
Diermeier et al.

[11] Patent Number: 6,130,982
[45] Date of Patent: Oct. 10, 2000

[54] CABLE SLEEVE FOR LIGHT WAVEGUIDE CABLES

[75] Inventors: Heinz Diermeier, Munich; Peter Dotzer, Berg; Ernst Mayr, Starnberg; Guenter Schroeder, Esting; Guenther Weber, Burgkirchen, all of Germany

[73] Assignee: Siemens Aktiengesellschaft, Munich, Germany

[21] Appl. No.: 09/070,321

[22] Filed: Apr. 30, 1998

[30] Foreign Application Priority Data

Apr. 30, 1997 [DE] Germany .......................... 197 18 477

[51] Int. Cl.[7] ...................................................... G02B 6/36
[52] U.S. Cl. ............................................ 385/135; 385/134
[58] Field of Search ...................................... 385/134, 135

[56] References Cited

U.S. PATENT DOCUMENTS

| | | |
|---|---|---|
| 4,709,980 | 12/1987 | Coll et al. . |
| 4,798,432 | 1/1989 | Becker et al. .......................... 385/135 |
| 4,802,724 | 2/1989 | Fraize et al. .......................... 385/135 |
| 5,013,121 | 5/1991 | Anton et al. .......................... 385/135 |
| 5,189,724 | 2/1993 | Hartley . |
| 5,235,665 | 8/1993 | Marchesi et al. ...................... 385/135 |
| 5,247,603 | 9/1993 | Vidacovich et al. ................... 385/135 |
| 5,319,732 | 6/1994 | Jones ...................................... 385/135 |
| 5,457,763 | 10/1995 | Kerry et al. ............................ 385/135 |

FOREIGN PATENT DOCUMENTS

| | | |
|---|---|---|
| 38 43 192 | 6/1990 | Germany . |
| 41 32 519 | 4/1993 | Germany . |
| 94 10 568 | 10/1994 | Germany . |
| 44 39 853 | 5/1996 | Germany . |

Primary Examiner—John D. Lee
Assistant Examiner—Michael J. Stahl
Attorney, Agent, or Firm—Hill & Simpson

[57] ABSTRACT

A cable sleeve for light waveguides is constructed as a flat plate member in which a circular groove extends and has inlets extending tangentially from the groove. The cable sleeve can receive excess lengths of the cable as well as splices which excess lengths and splices are received in the circular groove.

26 Claims, 3 Drawing Sheets

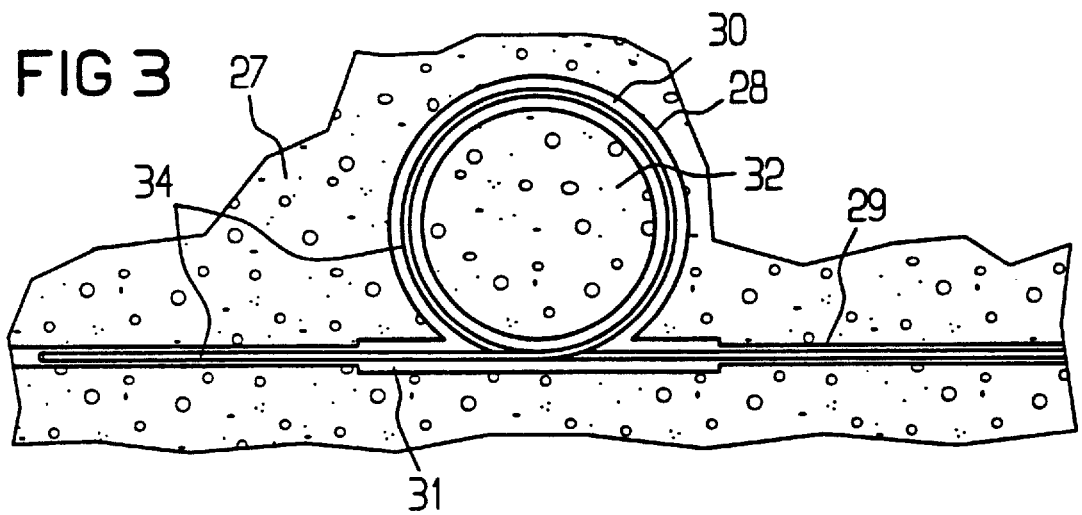
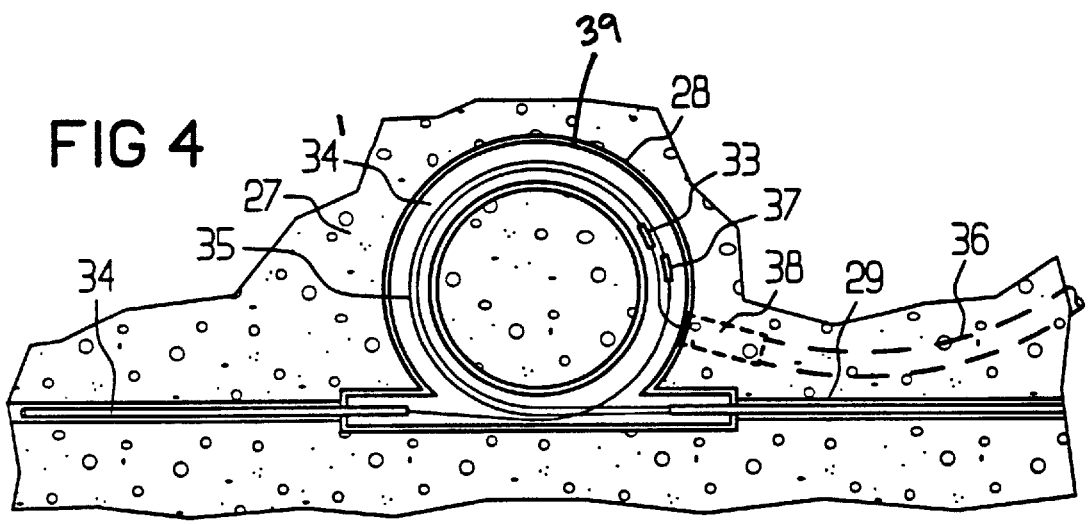
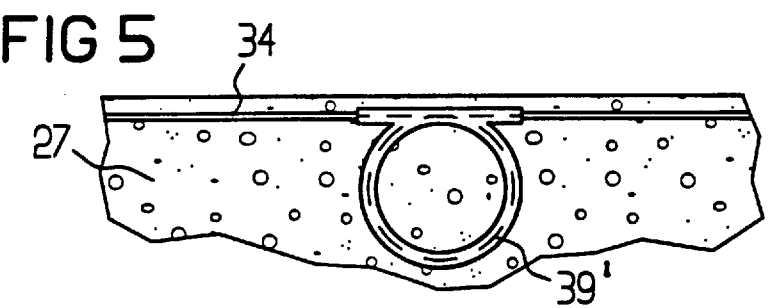

CABLE SLEEVE FOR LIGHT WAVEGUIDE CABLES

BACKGROUND OF THE INVENTION

The present invention is directed to a cable sleeve for light waveguide cables.

German OS 44 39 853 discloses a connection, branching and distribution sleeve for light waveguide cables that is suited for acceptance, splicing and distribution of light waveguides and the sleeve receives splicing cassettes which allow a storing of excess lengths of the light waveguides. The arrangements are for example housed in a cylindrical cable sleeve housing that consists of a sleeve tube and the front side sealing element or that is fashioned as a hood sleeve. However, a sleeve housing of this type is not suited for use in light waveguide cable apparatuses that are laid in fixed beds such as for example road surfaces because the cost of installing these sleeve housings is too high. Up to now, what are known as subsurface containers have been used for receiving splicing connections. In laying microcables from a tube, and light waveguides housed loosely therein, milled-in grooves in the fixed laying bed such as streets or the like have been used and the use of conventional cable sleeves is disadvantageous because a very large excavation has to be carried out in the laying bed. Moreover, such light waveguide cable systems are laid at small depths so that the additional measures have to be taken for the introduction of the cable into the previously deeper lying cable sleeves.

SUMMARY OF THE INVENTION

The object of the present invention is to create a cable sleeve that can be housed in a fixed laying bed at a relatively small depth and in which the requirements for the splicing of light waveguides and the storing of excess lengths of the light waveguides and for branching and distribution are met. This object is achieved with a cable sleeve for light waveguide cables that is fashioned as a flat sleeve member, has a circular groove arranged in the flat sleeve member with inlets for the light waveguides that extend tangentially to the circular groove, has cable supports arranged at the inlets and has a cover with a seal for covering the groove.

In using the inventive cable sleeve, one advantage results in that due to the flat construction it can be used in a simple manner at very small depths in particular at a small depth of the light waveguide cables which are routed in the fixed lying bed such as microcables. A microcable system runs in laying grooves preferably at a depth of about 30 mm so that the inlets in these flat cable sleeves can take place at an equal depth.

The inventive cable sleeve can be constructed as a disc or also as a ring in which the circular grooves are formed. Inlets are connected tangentially to these grooves so that after the removal of the cable sheath or respectively the tube, the light waveguides can be easily routed in the same plane. Another advantage is that in the grooves of the cable sleeve according to the present invention, the light waveguides can be routed, splices can be stored and in addition the light waveguides of the light waveguide cables that are uncut or in which the first cut has been made as well as excess lengths of the light waveguides in reserve lengths can be brought in without further addition. By this means, the expensive distribution to corresponding light waveguide cassettes as in the case of previous systems is omitted. The surveyability is thereby completely sufficient to the flat construction.

In the tangential inlets, the cable sheaths or respectively tubes of the microcables are respectively supported and these cable supports are preferably fashioned as clamping regions or connections. The clamping of the cable sheaths or respectively the tubes occurs either by means of a separate clamping cover or by means of a cover that covers the entire sleeve. Preferably four inlets are provided on the cable sleeve whereby each pair lies on a tangent line. However, additional inlets with corresponding connection supports are also possible so that the corresponding connection supports can then be subsequently provided or can be subsequently attached.

The cable sleeve according to the present invention can be constructed as a disc or also as a ring. The latter construction is particularly advantageous if during manufacturing the laying grooves for the microcables in the fixed laying bed, a circular portion is also milled in the fixed laying bed for the cable sleeves of the inventive device that are to be set in later.

Other objects and features of the invention will be readily apparent from the following description of the preferred embodiments, the drawings and claims.

BRIEF DESCRIPTION OF THE DRAWINGS

FIG. 3 is a plan view illustrating the construction of an annular groove for the acceptance of the cable sleeve during the laying process;

FIG. 4 is a plan view illustrating a cable sleeve in the horizontal arrangement in the laying bed with the construction of an additional inlet;

FIG. 5 is a vertical cross sectional view showing the vertical introduction of the cable sleeve.

DESCRIPTION OF THE PREFERRED EMBODIMENTS

Figure 1:
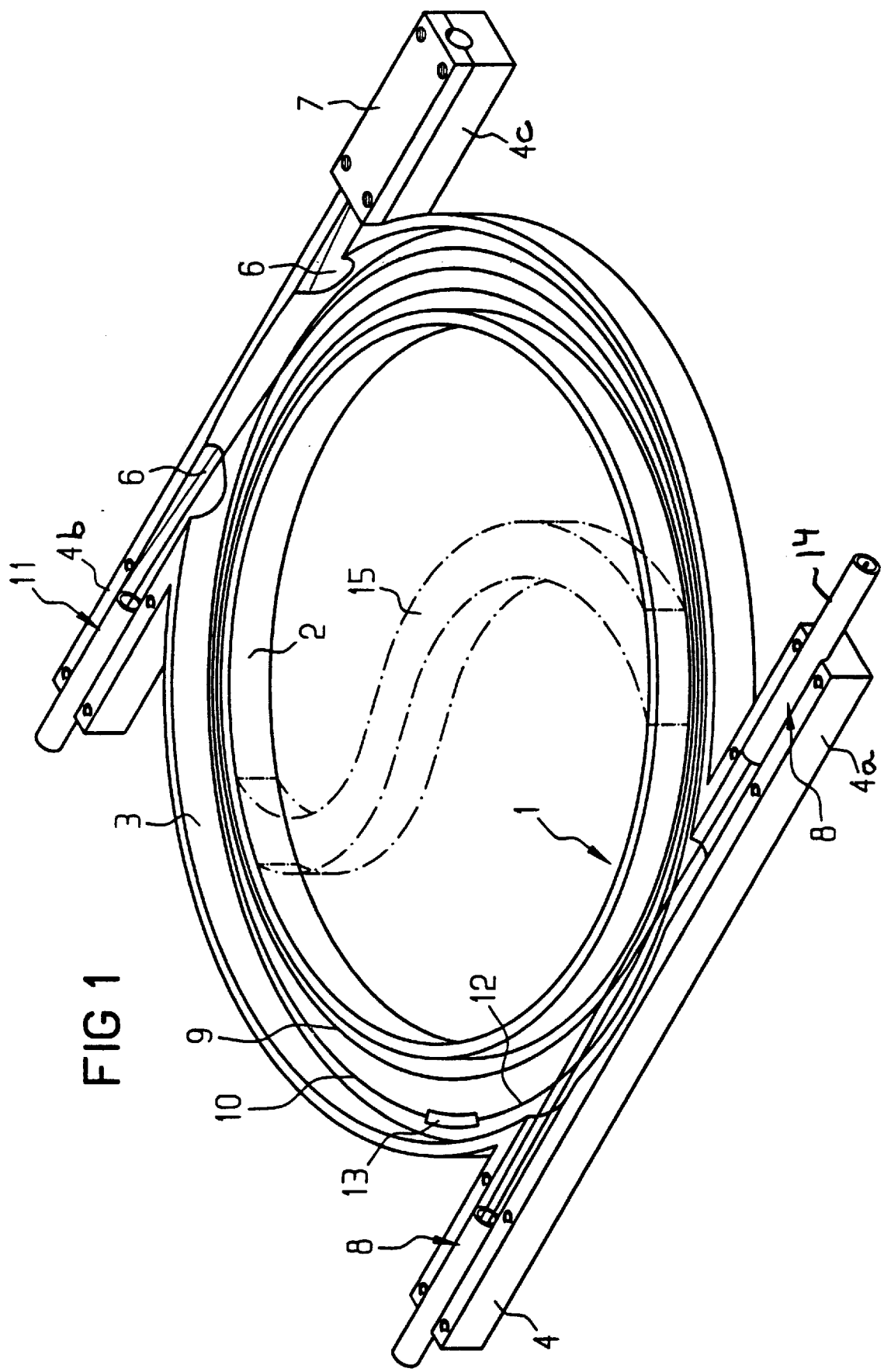
FIG. 1 is a perspective view of an annular cable sleeve according to the present invention.

The principles of the present invention are particularly useful when incorporated in a flat cable sleeve generally indicated at 1 in FIG. 1 which cable sleeve has an annular construction. As illustrated, the flat sleeve 1 has an annular ring shape however it could be a circular disc having a circular groove 3 formed therein.

In the flat sleeve 1, a circular groove 3 is formed in the circular ring 2. The sleeve 1 has four cable inlets 4–4c which are arranged with the inlet 4 and 4a lying on one tangential line and the inlet 4b and 4c lying on another tangential line. With the tangential arrangement for the inlet such as 4 and 4a, a rectilinear further routing without splicing is also possible.

Introduced cable sheaths or tubes 14 for the microcable 8 are supported in the inlets 4 and 4a preferably in a clamping groove that is correspondingly adapted to the diameter of the introduced cable or is brought to be to the form. In the presentation in FIG. 1, initially cut microcable 8 is for example introduced with the tube 14 being taken off in a required length for example with a special removal tool with which the tube is stripped from the fibers contained in the cable. In this initially cut microcable 8, uncut light waveguide or fiber 9 after circulation is passed around the groove 3 so that the cable which entered the inlet 4 can exit at the inlet 4a. One of the waveguides 10 of the cable 8 is spliced by a splice 13 to a waveguide 12 of the branch cable 11 which is received in the inlet 4b. As illustrated, the groove 3 is in communication with recesses 6 that extend into the respective inlets such as 4b and 4c. Inlets 4c is illustrated as being covered by a separate clamping cover 7 which allows the requirements for clamping and sealing to be produced. However, a single plate can be attached to seal the entire clamping area by being secured by threaded fasteners in the threaded bores adjacent each of the inlets 4–4c.

It is also possible, to provide the ring 2 with a connecting S shaped diagonal groove 15 which is shown in chain lines and which groove 15 will receive light waveguides. This has the advantage that a change in direction can take place by means of guiding the waveguide in this S-shaped diagonal groove 15 so that the light waveguide for example entering the inlet 4 can be led out the inlet 4c.

While the sleeve 1 is illustrated as a ring shape having a substantially hollow center, the grooves 3, 6 and the inlets 4–4c can be formed in a flat disc or plate.

Figure 2:
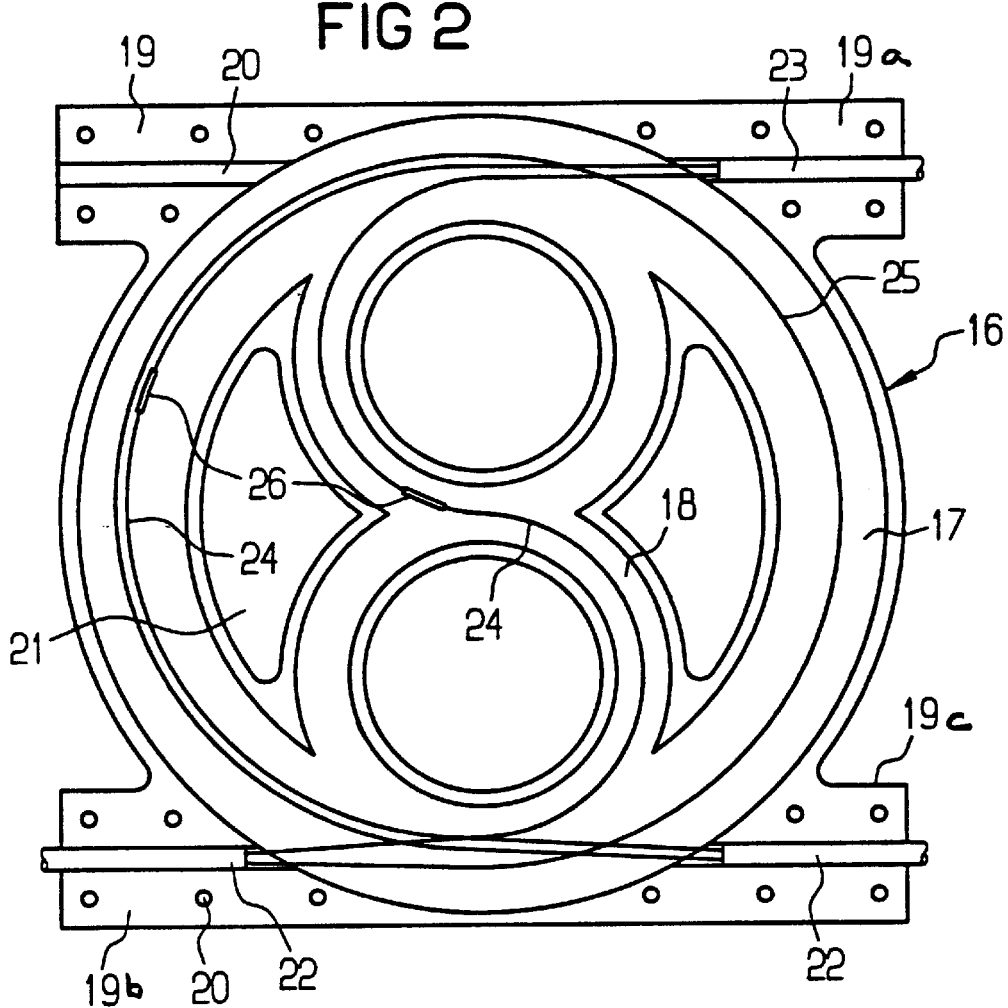
FIG. 2 is a modification of the annular cable sleeve of the present invention with additional FIG. 8 shaped diagonal grooves.

An embodiment of the flat sleeve is generally illustrated at 16 in FIG. 2 and this embodiment has a circular groove 17 which has two interconnecting S-shaped diagonal grooves 18 that form a FIG. 8 shaped arrangement. In this way, a change in the direction of the light waveguides in every direction becomes possible. In the annular construction, then there results a cutout segment such as 21 between the portion forming the diagonal grooves 18 and the outer ring. These cutout segments 21 can be omitted if a disc shaped construction is desired.

The flat sleeve 16 in addition to the annular groove 17 is provided with inlets 19–19c with the inlets 19 and 19a lying on one tangential line and the inlets 19b and 19c lying on an opposite tangential line. The tubes of the microcable 22 are supported in a clamping fashion in the inlet such as 19b and 19c. A corresponding clamping element such as screws or the like engaged in bores 20 can be provided. Thus, a continuing and uncut light waveguide such as 25 of the cable 22 can be looped in the groove 17 or in the groove 17 and diagonal grooves 18. As illustrated, the groove 17 and diagonal grooves 18 also support splices 26 which are used to splice fibers such as optical waveguides or fibers 24 to waveguides of a cable 23 which is a branching cable mounted in the inlet 19a. As illustrated, due to the shapes of diagonal grooves 18, a fiber such as 24 can be branched from the inlet 19b to the inlet 19a from a connection between the microcable 22 and the branching cable 23. Here as well, partial covering or overall covering of the entire grooves is possible by securing a flat plate to cover the grooves 17 and 18.

When laying a microcable such as 34 in a fixed laying bed 27 as shown in FIG. 3, as a precautionary measure for later use, an annular groove 30 with groove walls 28 is milled or formed in the laying bed 27 in addition to the grooves 29. As illustrated in FIG. 3, the groove 30 is larger than the groove 29 and in the region of its tangential connection to the groove 29 has an enlarged tangential groove 31. A microcable 34 is thus provided in the grooves 29 and laid in a circle in the groove 30.

At a later date, when it is necessary to form splices, the microcable 34 can be removed from its annular groove 30 and freed from the cable sheath in the portion which was received in groove 30. An annular flat sleeve 39 according to the present invention is then inserted into the annular groove 30 or into a prepared hole and the released light waveguides are then laid in a circular groove 34' of the flat sleeve 39 after correspondingly forming the splices such as 33 and 37. As illustrated in FIG. 4, the exposed waveguide such as 35 lies in an annular groove 34' of the insert 39. In addition, further modification is also shown wherein in addition to the integrally formed inlets of the flat sleeve, an additional inlet for cable 36 has been arranged. For this purpose, an opening to the groove 34' has been made in the wall of the flat sleeve 39 or is otherwise provided. A terminal support 38 is mounted in this opening and receives the end of the cable 36. In the same way, grounding through holes or other inlets for widely varying purposes can be provided.

In the arrangements of FIGS. 3 and 4, the flat sleeve 39 of the microcable system such as 34 was laid in a laying bed to lie horizontally below the surface of the bed. In FIG. 5, the sleeve 39' is mounted to extend vertically into the bed. If little space is available laterally or if the flat sleeve is to be protected against particular high loads, the vertical arrangement is advantageous.

Figure 6:
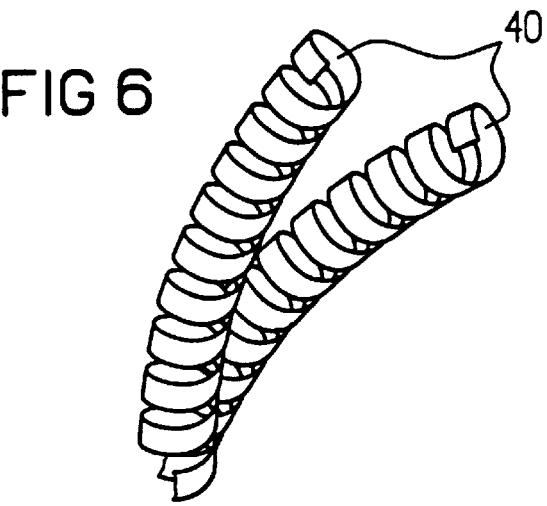
FIG. 6 is a perspective view of rodent proof protection for the annular cable sleeve.

To protect connections to the annular flat sleeve from rodents and termites, spiral shaped protecting tubes 40 (see FIG. 6) can be provided. These tubes 40 are wound around the flat sleeve and/or the connections.

The cable sleeves according to the present invention can also be used advantageously in air cable installations since for example two inlets lying in a tangent line can be used as a clamping apparatus for connection to a support cable or a grounding cable of a high voltage installation. Thus, for longer lengths or given a defect in the strapped on light waveguide air cable, a splice can be carried out in a simple uncomplicated manner especially since the inventive constructions are sleeves that are very easy to assemble. The clamping apparatus also easily enables a mast arrangement.

One area of use of this flat sleeve is in office buildings where due to the flat construction it can be arranged in false ceilings for example as a floor distributor or a distribution sleeve.

Aids for opening the cover or respectively the covering can also be provided in the flat sleeve according to the present invention, for example by means of eyes or projections for mechanical opening. However, a pneumatic opening can also take place if an over pressure is created within the flat sleeve via a pressure feed inlet so that the cover or respectively the covering are thereby lifted off.

The flat sleeve according to the present invention can be made of corrosion resistant material. Preferably it is made from a material selected from a group consisting of metal, cast metal, plastic or glass fiber reinforced plastic.

The flat sleeve according to the present invention is used as a connection and branching sleeve and at least 200 fibers or respectively light waveguides can be stored in it in either a cut form or an uncut form. In the inlets, formed at the same time as the cable support, grounding through connections can also be made at the same time. The known type of splices such as crimp splicing, shrink tube splices and preferably Techni-Tubes can likewise be used to protect splices.

A preferred criteria which however is not compulsorily predetermined, in using the flat sleeve in conjunction with microcable systems are as follows:

an inner diameter of the circular laying groove in the laying bed being 150 to 300 mm;

the width of the laying groove in the laying bed being 30 mm;

the depth of the laying groove in the laying bed 30 mm;

the length of the recess of the laying groove for accepting the inlet of the cable sleeve 250 mm;

the groove in the flat sleeve 20 to 25 mm;

the groove depth of the flat sleeve being approximately 10 mm; and the length of the inlet regions of two inlets 240 mm.

In addition, the grooves of the inventive flat sleeve can also be filled with suitable filling compounds known in the cable fitting technology which compounds are pressed in through a corresponding filling opening (not illustrated).

Although the present invention has been described with reference to a specific embodiment, those of skill in the art will recognize that changes may be made thereto without departing from the scope and spirit of the invention as set forth in the appended claims.

We claim:

1. A cable sleeve for light waveguide cables, said cable sleeve comprising a flat sleeve member having a flat surface with a circular groove formed therein, cable inlets extending tangentially to said circular groove, each of said cable inlets having cable supports, a pair of interconnecting S-shaped grooves forming a figure 8-shaped groove extending diagonally across the circular groove to enable reversing the direction of a waveguide received in each inlets, and a cover arranged with a seal for covering the groove.

2. A cable sleeve according to claim 1, wherein the flat sleeve is constructed as a circular disc in which the groove runs.

3. A cable sleeve according to claim 1, wherein the flat sleeve is fashioned as a ring in which the groove runs.

4. A cable sleeve according to claim 1, wherein the radius of the circular groove corresponds at least to the minimum permissible bending radius of the light waveguides and is in a range of 150 to 300 mm.

5. A cable sleeve according to claim 1, wherein the circular groove has a depth of approximately 10 mm.

6. A cable sleeve according to claim 1, wherein the circular groove has a width of a range of 20 to 25 mm.

7. A cable sleeve according to claim 1, wherein the cable supports in the inlets are formed by a clamping groove for the cable sheath of the light waveguide cable being received therein.

8. A cable sleeve according to claim 1, wherein the sleeve is mounted in a horizontal plane in a laying bed.

9. A cable sleeve according to claim 1, wherein the sleeve is inserted in a vertical plane in a laying bed.

10. A cable sleeve according to claim 1, wherein said circular groove provides space for receiving a light waveguide splice.

11. A cable sleeve according to claim 1, which has a filling opening to enable filling the circular groove with a filling compound.

12. A cable sleeve according to claim 1, which has four inlets arranged in pairs with each pair of inlets lying on a tangential line to the circular groove.

13. A cable sleeve according to claim 1, wherein the sleeve is arranged in a circular bore in a fixed laying bed.

14. A cable sleeve according to claim 1, wherein the sleeve is arranged on a mast.

15. A cable sleeve according to claim 1, which has at least two inlets lying on a tangent line to the circular groove, said two inlets receiving a cable selected from a support cable and ground cable of a high voltage apparatus for mounting the cable sleeve.

16. A cable sleeve according to claim 1, which includes at least one connecting support arranged in a wall of the circular groove between inlets for receiving additional cables.

17. A cable sleeve according to claim 1, which includes grounding through guides being arranged in the sleeve.

18. A cable sleeve according to claim 1, wherein the cover has auxiliary means to enable removing the cover from said flat member.

19. A cable sleeve according to claim 1, which includes a pressure feed opening into the circular groove to enable applying pressure to remove the cover.

20. A cable sleeve according to claim 1, which includes receiving excess lengths of the light waveguides being laid in said circular groove.

21. A cable sleeve according to claim 1, wherein the flat member is formed of a corrosion proof material selected from a group consisting of metal, cast metal, plastic and glass reinforced plastic.

22. A cable sleeve according to claim 1, wherein the cable sleeve is surrounded with a protecting material for preventing damage by rodents and termites.

23. A cable sleeve according to claim 1, wherein the cover covers the circular groove and each of the inlets.

24. A cable sleeve according to claim 1, wherein the cover covers the circular groove and separate covers are provided for each of the inlets to form clamping covers.

25. A cable sleeve for light waveguide cables, said cable sleeve comprising a flat sleeve member having a flat surface with a circular groove formed therein, cable inlets extending tangentially to said circular groove, each of said cable inlets having cable supports, an S-shaped groove extending diagonally across the circular groove to enable reversing the direction of a waveguide received in the circular groove, and a cover arranged with a seal for covering the groove.

26. A cable sleeve according to claim 25, wherein points of intersection of the S-shaped groove with the circular groove are offset from the inlets.

* * * * *